(12) United States Patent
Warren et al.

(10) Patent No.: US 8,914,516 B2
(45) Date of Patent: Dec. 16, 2014

(54) PROVIDING AN INTEGRATED SUITE OF CLOUD-BASED, HOSTED AND INTERNAL APPLICATIONS

(75) Inventors: Christopher Warren, Franklin, MA (US); John P. Hake, Franklin, MA (US); Edward O'Brien, Attleboro, MA (US)

(73) Assignee: FMR LLC, Boston, MA (US)

( * ) Notice: Subject to any disclaimer, the term of this patent is extended or adjusted under 35 U.S.C. 154(b) by 282 days.

(21) Appl. No.: 13/466,713

(22) Filed: May 8, 2012

(65) Prior Publication Data

US 2013/0304797 A1 Nov. 14, 2013

(51) Int. Cl.
*G06F 15/173* (2006.01)
(52) U.S. Cl.
USPC ........................................... 709/226
(58) Field of Classification Search
CPC .. H04L 63/0815; H04L 67/10; H04L 63/0272
USPC .................. 709/201–203, 223–226
See application file for complete search history.

(56) References Cited

U.S. PATENT DOCUMENTS

| | | | |
|---|---|---|---|
| 5,692,132 A | 11/1997 | Hogan | |
| 6,330,598 B1 * | 12/2001 | Beckwith et al. | 709/223 |
| 6,826,696 B1 | 11/2004 | Chawla et al. | |
| 7,010,582 B1 * | 3/2006 | Cheng et al. | 709/219 |
| 7,099,834 B2 | 8/2006 | Dutta et al. | |
| 7,134,137 B2 | 11/2006 | Joshi et al. | |
| 7,693,988 B2 | 4/2010 | Barsness et al. | |
| 2001/0037451 A1 | 11/2001 | Bhagavatula et al. | |
| 2003/0130958 A1 | 7/2003 | Narayanan et al. | |
| 2003/0229783 A1 | 12/2003 | Hardt | |
| 2004/0250118 A1 | 12/2004 | Andreev et al. | |
| 2004/0254885 A1 | 12/2004 | Gernold | |
| 2005/0125285 A1 | 6/2005 | McQueeney et al. | |
| 2006/0179003 A1 | 8/2006 | Steele et al. | |
| 2006/0271689 A1 | 11/2006 | Kikuchi | |
| 2007/0174193 A1 | 7/2007 | Quan et al. | |
| 2007/0282724 A1 | 12/2007 | Barnes et al. | |
| 2008/0133612 A1 | 6/2008 | Liu et al. | |
| 2009/0138528 A1 | 5/2009 | Manzano | |
| 2009/0198772 A1 | 8/2009 | Kim et al. | |

(Continued)

OTHER PUBLICATIONS

"Schwab Announces PortfolioCenter for Investment Advisors," Business Wire, available at http://www.findarticles.com, Sep. 30, 2002, 3 pages.

(Continued)

*Primary Examiner* — Chirag R Patel
(74) *Attorney, Agent, or Firm* — Proskauer Rose LLP

(57) ABSTRACT

Methods and apparatuses, including computer program products, are described for providing an integrated suite of cloud-based, hosted, and internal applications. A server receives from a client device a request to access a portal comprising a plurality of cloud-based, hosted, and internal applications. The server determines an identity of the user, and one or more applications of the plurality of applications available for access by the user. The server establishes a link with one or more computing devices hosting the one or more available applications for providing functionality of the available applications. The server authenticates the user automatically for each of the available applications, and translates communications between the server and each of the applications based on a mapping configuration. The server integrates the established links into a user interface that provide access to each of the available applications, and provides the integrated user interface to the client device.

25 Claims, 5 Drawing Sheets

(56) References Cited

U.S. PATENT DOCUMENTS

| | | | |
|---|---|---|---|
| 2010/0042720 A1 | 2/2010 | Stienhans et al. | |
| 2010/0064033 A1 | 3/2010 | Travostino et al. | |
| 2010/0115612 A1 | 5/2010 | O'Brien et al. | |
| 2010/0131948 A1 | 5/2010 | Ferris | |
| 2010/0185968 A1 | 7/2010 | Hsu et al. | |
| 2010/0229226 A1* | 9/2010 | Yasrebi et al. | 726/6 |
| 2011/0016025 A1 | 1/2011 | Gaisford | |
| 2011/0131335 A1 | 6/2011 | Spaltro et al. | |
| 2011/0138047 A1 | 6/2011 | Brown et al. | |
| 2011/0277027 A1* | 11/2011 | Hayton et al. | 726/8 |

OTHER PUBLICATIONS

Schwab Portfolio Technologies® Brochure, Charles Schwab & Co., Sep. 2008, 16 pages.

"Power Advisor™—Product Features and Specifications," available from http://www.poweradvisortools.com/products/features.html, undated, 3 pages.

Bruckenstein, J., "Portfolio Management Tools Get Better," available from http://advisor.morningstar.com/articles/article.asp?docId=3786, Sep. 9, 2004, 4 pages.

InvestEdge Solutions, available at http://www.investedge.com, 2008, 6 pages.

FCSI—dbCAMS+, available at http://www.fcsi.com/products/Dbcams.htm, 2008, 1 page.

Captools/net™, available at http://www.captools.com/captoolsnet.htm, undated, 3 pages.

Southall, B., "Fidelity's 'better mousetrap' fails to get the competition to squeal," InvestmentNews, available at http://www.investmentnews.com, Apr. 18, 2005, 3 pages.

Janowski, D., "Advisers embracing 'cloud computing'," InvestmentNews, available at http://www.investmentnews.com/article/20091206/reg/312069949?template=printart, Dec. 6, 2009, 3 pages.

Virtual RIA Services Announcment, "VRIAS Announces Charter Products," available at http://www.virtualria.com/news/default.html, Jun. 8, 2010, 1 page.

* cited by examiner

PROVIDING AN INTEGRATED SUITE OF CLOUD-BASED, HOSTED AND INTERNAL APPLICATIONS

FIELD OF THE INVENTION

The subject matter of this application relates generally to methods and apparatuses, including computer program products, for providing an integrated suite of cloud-based, hosted, and internal applications to be used by financial services professionals.

BACKGROUND OF THE INVENTION

A registered investment advisor ("RIA") plays a critical role in managing the portfolio of an individual investor-client. The advisor must, at the very least, be able to review the asset allocation of the client, forecast the risks and benefits of alternative allocation scenarios, execute trades and transfers of the client's assets, and update the client's personal information. These responsibilities require the advisor to gather and utilize a vast array of data, from general market and business analytics to real-time asset valuation to specific client characteristics. In addition, many RIAs operate as solo practitioners or in small firms. As a result, they need general business and productivity software to manage the daily tasks and activities of running a small business.

Often, the diffuse nature of the sources providing the investment/business data and the repositories which hold it leads the advisor to rely on a multitude of different providers, each offering a discrete and separate application. These applications are frequently insulated from each other so that they cannot communicate easily or effectively to share information. Thus, the advisor must maintain separate log-in credentials for each application as well as ensure that redundant data across each application does not get out of sync. Also, the advisor must have each application available at his or her workstation, requiring time-consuming installation and configuration of each application. Access to the various software applications or suites for managing not only the portfolios of their clients but also performing routine business or productivity tasks also may be limited or costly.

Recently, cloud-based and hosted services and application software have become increasingly common to provide robust computing capability without the need for localized internal copies of hardware and software. Cloud-based and hosted applications enable the user to access desired functionality on demand, and provide the flexibility to provision a unique set of services to meet a particular user's need. However, internal, locally-installed applications are still prevalent in the marketplace and many users want to integrate these internal applications with the cloud-based and hosted offerings to have access to a custom suite of applications.

Therefore, it would be desirable to create a centralized application interface and portal that can provide one-time user authentication, presentation of data in a common context, workflow connectivity, and synchronous data management across a multitude of discrete third-party cloud-based, hosted, and internal applications. Such a centralized application interface and portal would provide cost savings and work efficiency improvements for the RIA.

SUMMARY OF THE INVENTION

In general overview, the techniques described herein are related to providing an integrated suite of cloud-based, hosted, and internal applications. The techniques provide for a single access point and launch site (including single sign-on) for software applications and components assembled from a diverse roster of cloud-based, hosted, and internal applications. The techniques also provide for standardized integration across multi-vendor service offerings that provides users with improved productivity and enhanced servicing capabilities. The techniques also provide for flexible customization of a unique service offering, where a user's access is easily managed and quickly changed according to a self-service model.

The invention, in one aspect, features a computerized method for providing an integrated suite of cloud-based, hosted, and internal applications. The method includes receiving, at a server from a client device, a request to access a portal comprising a plurality of cloud-based, hosted, and internal applications, the request to access including credentials associated with a user of the client device. The method also includes determining, at the server and based on the credentials, an identity of the user, and one or more applications of the plurality of applications available for access by the user. The method also includes establishing, by the server with one or more computing devices hosting the one or more available applications, a link for providing functionality of the available applications. The establishing step includes authenticating the user automatically for each of the available applications, and translating communications between the server and each of the available applications based on a mapping configuration stored at the server. The method also includes integrating, by the server, the established links into a user interface that provide access to each of the available applications, and providing, by the server to the client device, the integrated user interface.

The invention, in another aspect, features a system for providing an integrated suite of cloud-based, hosted, and internal applications. The system includes a server configured to receive, from a client device, a request to access a portal comprising a plurality of cloud-based, hosted, and internal applications, the request to access including credentials associated with a user of the client device. The server is also configured to determine, based on the credentials, an identity of the user, and one or more applications of the plurality of applications available to be accessed by the user. The server is also configured to establish, with one or more computing devices hosting the one or more available applications, a link for providing functionality of the available applications. The establishing step includes authenticating the user automatically for each of the available applications, and translating communications between the server and each of the available applications based on a mapping configuration stored at the server. The server is also configured to integrate the established links into a user interface that provides access to each of the available applications, and provide, to the client device, the integrated user interface.

The invention, in another aspect, features a computer program product, tangibly embodied in a non-transitory computer readable storage medium, for providing an integrated suite of cloud-based, hosted, and internal applications. The computer program product includes instructions operable to cause a data processing apparatus to receive, from a client device, a request to access a portal comprising a plurality of cloud-based, hosted, and internal applications, the request to access including credentials associated with a user of the client device. The computer program product also includes instructions operable to cause a data processing apparatus to determine, based on the credentials, an identity of the user, and one or more applications of the plurality of applications available to be accessed by the user. The computer program product also includes instructions operable to cause a data processing apparatus to establish, with one or more computing devices hosting the one or more available applications, a link for providing functionality of the available applications. The establishing step includes authenticating the user automatically for each of the available applications, and translating communications between the server and each of the available applications based on a mapping configuration stored at the server. The computer program product also includes instructions operable to cause a data processing apparatus to integrate the established links into a user interface that provides access to each of the available applications, and provide, to the client device, the integrated user interface.

In some embodiments, any of the above aspects can include one or more of the following features. In some embodiments, the server stores the integrated user interface and associated established links into a profile associated with the user. In some embodiments, the server receives from the client device a request for access to an additional application not currently available to the user, updates the one or more applications available to be accessed by the user to include the additional application, and establishes, with the computing device hosting the additional application, a link for providing functionality of the additional application.

In some embodiments, the server receives from a first one of the available applications, a request to perform an action using the functionality of a second one of the available applications, and translates the request to perform an action into a format compatible with the second one of the available applications. In some embodiments, the determining step includes determining, at the server and based on the credentials, one or more functions of the available applications that are accessible by the user. In some embodiments, the server receives from the client device, a search request including a keyword, transmits the search request to a plurality of the available applications, and receives from the plurality of the available applications, a response to the search request including information associated with the keyword.

In some embodiments, the server tracks communications between the server and the one or more available applications, and stores the tracked communications. In some embodiments, the links between the server and the one or more computing devices hosting the one or more available applications are established using an application programming interface (API) associated with the respective available applications. In some embodiments, the functionality available in each API is based on the user identity.

In some embodiments, the plurality of cloud-based, hosted, and internal applications are offered by different third-party providers. In some embodiments, the integrated user interface includes a dashboard of the established links and the server receives from the client device a request to access one of the available applications represented by an established link and provides a separate user interface for the requested application. In some embodiments, the separate user interface is customized based on the user identity. In some embodiments, the plurality of cloud-based, hosted, and internal applications includes productivity applications, business management applications, customer relationship management applications, database applications, accounting applications, document storage applications, portfolio management applications, financial planning applications, asset allocation applications, social network applications, or any combination thereof.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
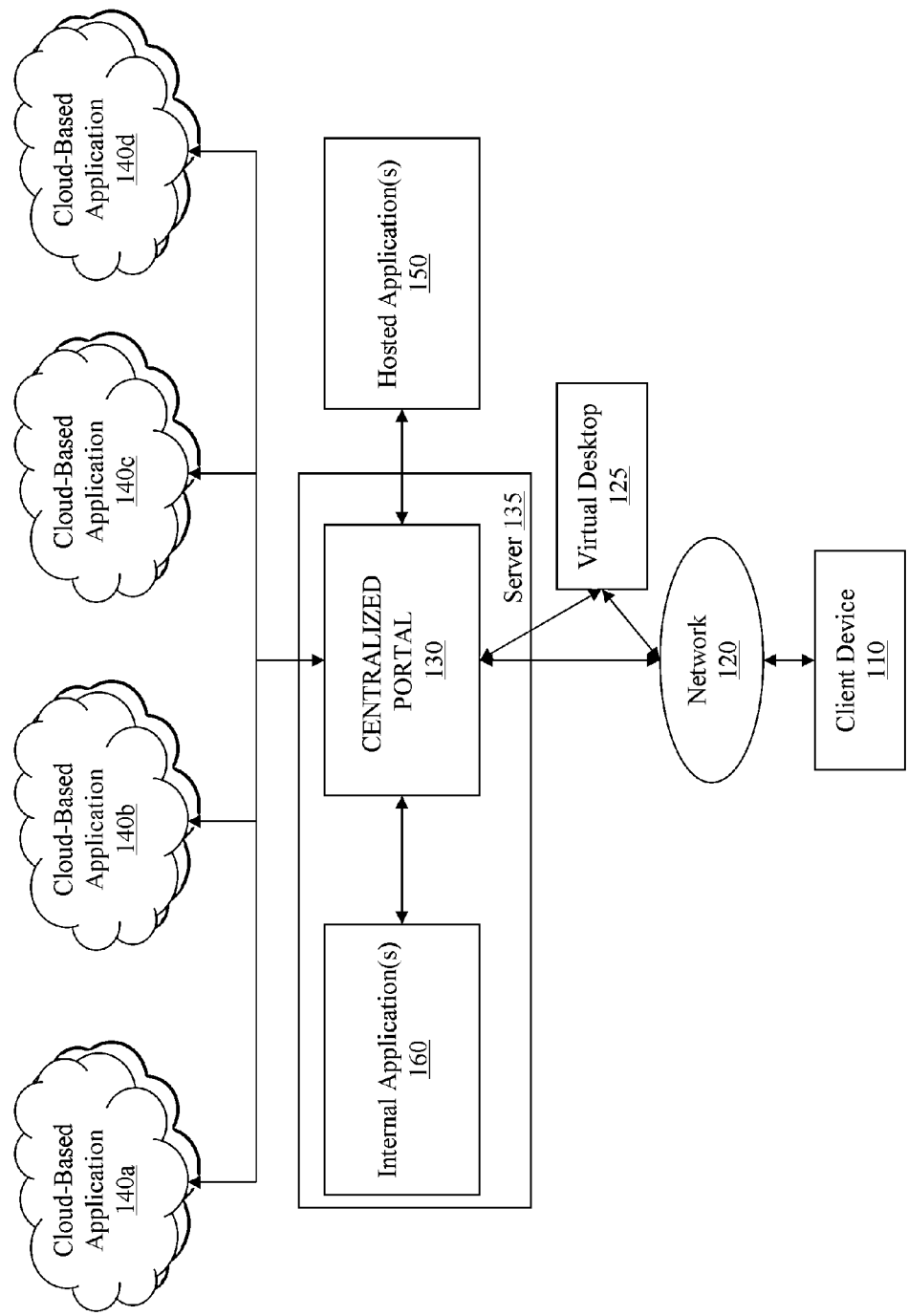
FIG. 1 is a block diagram of a system for providing an integrated suite of cloud-based, hosted, and internal financial services applications.

FIG. 1 is a block diagram of an exemplary system 100 for providing an integrated suite of cloud-based, hosted, and internal applications. In FIG. 1, the system 100 includes a client device 110, a communications network 120, a virtual desktop 125, a centralized portal 130 served by a server computing device 135, a plurality of cloud-based applications 140a-140d, one or more hosted application(s) 150, and one or more internal application(s) 160.

The client device 110 is the hardware that a registered investment advisor, for example, uses to connect to and interact with the centralized portal 130. Example computing devices take on many forms, including but not limited to a personal computer, a personal digital assistant (PDA), an internet appliance, a smart phone, a thin client, a tablet computer, or the like. The client computing device 110 includes network-interface components to enable the user to connect to communications network 120, such as the Internet.

The communications network 120 channels communications from the client device 110 to the centralized portal 130 on the server computing device 135 and back. The network 120 may be a local network, such as a LAN, or a wide area network, such as the Internet. In some embodiments, the same network 120 can be used to connect the centralized portal 130 to the plurality of cloud-based applications 140a-140d and the hosted application(s) 150.

The virtual desktop 125 is a module that connects the client device 110 to the server computing device 135 that hosts the centralized portal 130. The virtual desktop 125 provides a server-based operating system and application program interface to the client device 110, in cases where the client device 110 may not have the requisite capability to execute a local version of the desktop (e.g., a thin client). The virtual desktop 125 offers the look, feel and functionality of a locally-executing client, such as access to applications and networking services, but the application and networking execution is conducted by a remote server (e.g., server 135). An example of virtual desktop software is XenDesktop from Citrix Systems, Inc. of Fort Lauderdale, Fla.

The centralized portal 130 is a software service made available from a server computing device 135. The centralized portal 130 receives connection requests from the client device 110 via network 120. In some embodiments, the client device 110 can open a connection to the centralized portal 130 on the server 135 by opening a web browser and entering the address (e.g., URL) of the server 135 on which the centralized portal 130 is located. The centralized portal 130 also connects to the plurality of cloud-based applications 140a-140d, hosted application(s) 150, and internal application(s) 160 to provide those applications to the client device 110. The centralized portal 130 will be described in greater detail with reference to FIG. 2.

Returning to FIG. 1, the system 100 also includes a plurality of cloud-based applications 140a-140d. The cloud-based applications 140a-140d can each be managed by separate service providers, which communicate with the centralized portal 130 via a communications network (e.g., the Internet). In some embodiments, two or more of the cloud-based applications 140a-140d can be managed by the same service provider. The server computing device 135 that hosts the centralized portal 130 can provide one or more internal applications (e.g., internal application(s) 160) that are also resident on the server computing device 135. In some embodiments, the server computing device 135 can be connected to other internal applications that are provided by the same service provider that owns the centralized portal 130. Each of the internal applications can be made available to the client device 110 in the same manner that a cloud-based application 140a-140d is made available.

The cloud-based applications 140a-140d are made available by their respective service providers, and the centralized portal 130 enables the client device 110 to gain access to the functionality of the cloud-based applications 140a-140d without having to connect to each cloud-based application individually and manage each cloud-based application separately. While FIG. 1 depicts four cloud-based applications 140a-140d, it should be appreciated that the system 100 can include any number of cloud-based applications.

The cloud-based applications 140a-140d can comprise a number of different types of applications. The applications can be related to the internal functions of managing a business (e.g., payroll, timekeeping, training, expense reports, human resources, accounting, news, Wilds, recruiting, and analytics/BI). The applications can be related to the communications and documentation infrastructure of a business (e.g., email, spreadsheets, productivity software, collaboration, audio/video conferencing, web hosting/design, virtual desktop, document archival and storage, e-signature, data backup). The applications can be related to providing financial and investment services to clients (e.g., financial planning, brokerage trading and account inquiry/maintenance, asset allocation, and portfolio management). The applications can be related to benefits-related assets attributed to clients (e.g., health insurance, retirement accounts, life insurance). The applications can be related to managing a relationship with clients (e.g., customer relationship management (CRM), social network monitoring, market research, client satisfaction surveys, discounts, referrals). The applications can be related to regulatory and governmental duties of the business (e.g., compliance, SEC guidelines, and government databases). Any of the applications 140a-140d can be combined into a single suite, customized for a particular user or group of users, which is accessible by a client device 110 via the centralized portal 130.

The hosted application(s) are application programs virtually hosted by the server computing device 135 from a third-party or other source. The server computing device 135 connects to the hosted application 150 source, authenticates the user with the hosted application 150, and provides access to the hosted application 150 to the user via the centralized portal 130. The hosted application 150 has similar characteristics and functionality to the cloud-based applications 140a-140d (e.g., related to business activities). Generally, the hosted application 150 is purchased by the user and installed on a computing device, optionally also purchased by the user, at a separate location (e.g., data center) from the user's client computer. The hosted application 150 provides the full functionality as the same software installed locally on the user's client computer. In most cases, the user has complete control over the application 150 and can customize the application 150 to suit his or her needs. The server computing device 135 can connect to the computing device that provides the hosted application 150 via a number of common network paradigms (e.g., Internet, WAN, LAN). While FIG. 1 depicts one hosted application 150, it should be appreciated that the system 100 can include any number of hosted applications.

The internal application(s) are application programs that are locally installed and executed on the server computing device 135. Instead of connecting to remote computing devices as with the cloud-based applications 140a-140d and the hosted application 150, the server computing device 135 executes the internal application 160 from local storage (e.g., a hard drive) using the server's own computing resources (e.g., processor, memory). While FIG. 1 depicts one internal application 160, it should be appreciated that the system 100 can include any number of internal applications.

Figure 2:
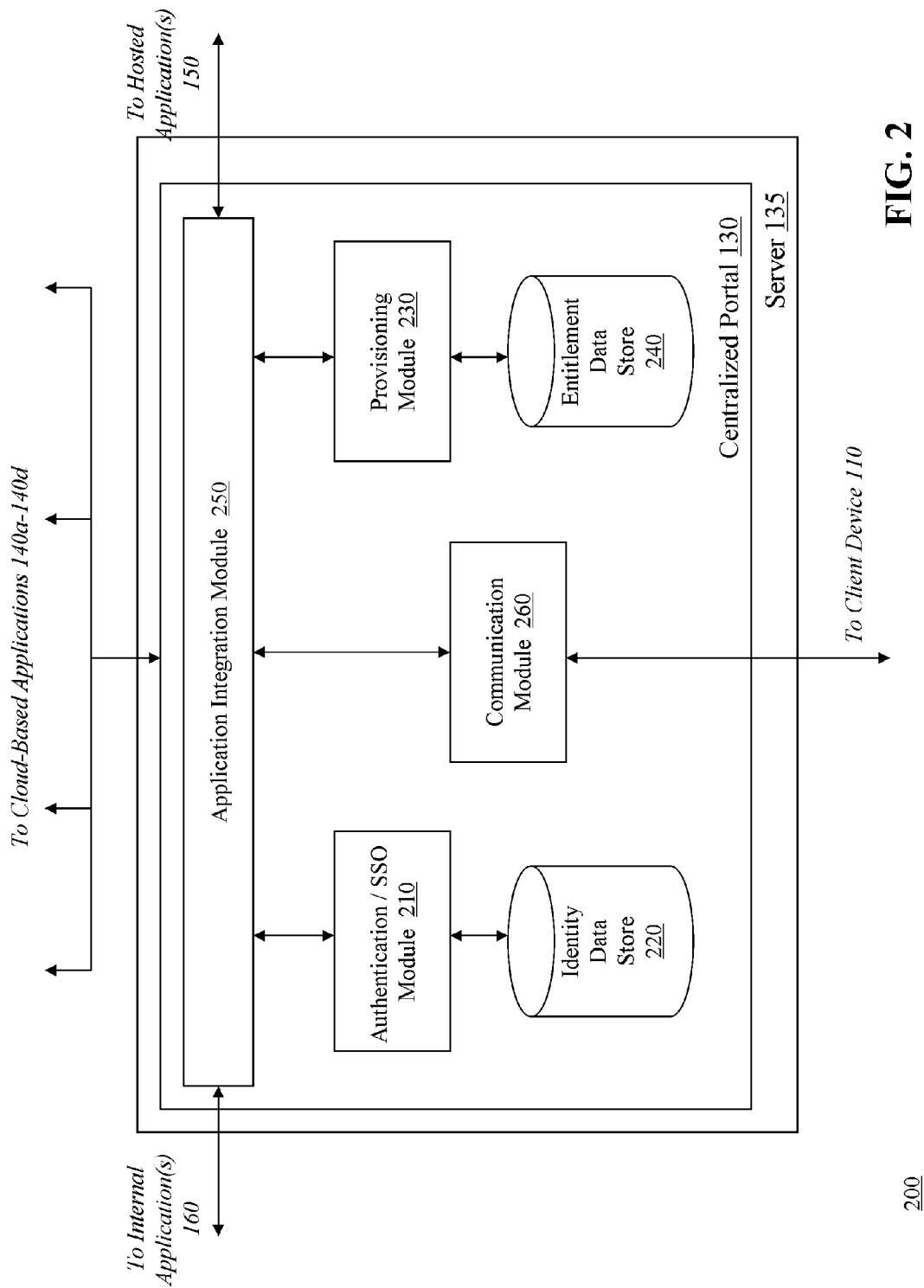
FIG. 2 is a detailed block diagram of a centralized portal for providing an integrated suite of cloud-based, hosted, and internal financial services applications.

FIG. 2 is a detailed block diagram of a centralized portal 130, executing on a server computing device 135, for providing an integrated suite of cloud-based applications 140a-140d, hosted application(s) 150, and internal application(s) 160. The centralized portal 130 includes an authentication/single sign-on (SSO) module 210 which is coupled to an identity data store 220. The centralized portal 130 includes a provisioning module 230 which is coupled to an entitlement data store 240. Each of the authentication/SSO module 210 and the provisioning module 230 are coupled to an application integration module 250 included in the centralized portal 130. The application integration module 250 is coupled to a communication module 260, which handles preparation and transmission of data traffic between the client device 110 and the application integration module 250 of the centralized portal 130. In some embodiments, each of the modules 210, 230, 250, 260 are software processes executing on a processor located in the server 135.

The authentication/SSO module 210 handles requests received from the client device 110 to access the cloud-based applications 140a-140d, hosted application(s) 150, and internal application(s) 160. The authentication/SSO module 210 validates the identity of a user (e.g., RIA) at the client device 110 to determine whether the user is authorized to obtain access to the applications 140a-140d, 150, and 160. To validate the identity of the user at the client device 110, the authentication/SSO module 210 communicates with the identity data store 220. The identity data store 220 maintains an account for each user that is registered to access the centralized portal, serving as a repository for user login credentials and similar types of security information that relate to a user's access to the centralized portal 130 as a whole (e.g., encryption keys, IP address of the client device 110, previous login attempts).

Because each of the plurality of applications 140a-140d, 150, and 160 can maintain a separate login account for the user, the identity data store 220 also contains each registered user's login credentials for the plurality of applications 140a-140d, 150, and 160 to which the user has been granted access. As a result, the user needs only to provide his or her credentials related to the centralized portal 130 when logging in from the client device 110. When the user accesses one of the applications 140a-140d, 150, and 160, the application integration module 250 seamlessly requests the user's individual credentials for that application (e.g., 140a) from the authentication/SSO module 210 and identity data store 220. The application integration module 250 then automatically logs in to the application 140a with the appropriate user credentials, and the user at the client device 110 does not have to enter any additional login information.

The provisioning module 230 determines which applications 140a-140d, 150, and 160 a particular user can access, and also determines the level of access permissions that should be provided to the user for each application. After the centralized portal 130 has validated the identity of the user at the client device 110, the provisioning module 230 retrieves a list of the applications 140a-140d, 150, and 160 available to the user from the entitlement data store 240 and instructs the application integration module 250 to establish a connection to those applications and make them available to the client device 110 via the centralized portal 130.

The provisioning module 230 also contains data that enables the application integration module 250 to configure the applications 140a-140d, 150, and 160 based on the particular user. For example, a user may have been purchased access to a basic version of cloud-based application 140b, while a second user may have purchased access to a deluxe version of the same application 140b which provides additional features not found in the basic version. The provisioning module 230 instructs the application integration module 250 to enable the first user to have the limited set of functionality of the application 140b that is associated with the basic version, and the provisioning module 230 instructs the application integration module 250 to enable the second user to have the broader set of functionality of the application 140b that is associated with the deluxe version. In this manner, each user of the centralized portal 130 can have a customized, unique set of applications 140a-140d, 150, and 160, and features within those applications, based on a desired service level and/or cost.

The provisioning module 230 also tracks usage of the applications 140a-140d, 150, and 160 by user and/or groups of users (e.g., an investment firm). In some embodiments, the provisioning module 230 also tracks the specific functionality within each of the applications 140a-140d, 150, and 160 that is being used. The tracking data can be stored in the entitlement data store 240 for later analysis. For example, if each of the users at a particular investment firm frequently accesses a cloud-based email client application, the centralized portal 130 can determine that a similar cloud-based application—a mobile email client application—should be offered to the users.

The application integration module 250 receives requests from the client device 110 to access the applications 140a-140d, 150, and 160, and the application integration module 250 communicates with the authentication/SSO module 210 and the provisioning module 230 to configure the centralized portal 130 for the user. Once the user has been authenticated to the centralized portal 130 and the list of available applications (e.g., 140a and 140c) has been determined, the application integration module 250 establishes a connection to each of the available applications 140a and 140c and provides the requisite login credentials for that user to each of the applications 140a and 140c.

The application integration module 250 also handles the translation of data and commands between the centralized portal 130 and each of the individual applications 140a-140d, 150, and 160. Because the applications 140a-140d, 150, and 160 may be offered by many different service providers, the applications 140a-140d, 150, and 160 may use different types of communications interfaces and protocols to provide access to the centralized portal 130. Also, in some cases, the applications 140a-140d and 150 reside on legacy systems that are not capable of communicating with the centralized portal 130 using current protocols or techniques. Therefore, the application integration module 250 is capable of adapting to establish communications channels with each of the applications 140a-140d, 150, and 160, regardless of the application's particular communication requirements.

The application integration module 250 identifies the application to which the module 250 is communicating and retrieves a mapping configuration stored at the server 135. The mapping configuration can be stored in a database (not shown) coupled via hardware connection to the server 135, or in a database coupled via networking connection to the server 135. In some embodiments, the mapping configuration includes the structure of data elements in the applications 140a-140d, 150, and 160. In some embodiments, the mapping configuration includes the protocol used by the applications 140a-140d, 150, and 160. In some embodiments, the mapping configuration includes the application programming interface (API) commands used by the applications 140a-140d, 150, and 160.

In some embodiments, to communicate with the applications 140a-140d, 150, and 160, the application integration module 250 can use a standard protocol (e.g., XML, JSON) that is common to both the centralized portal 130 and the application(s). In some embodiments, the application(s) 140a-140d, 150, and 160 can provide a proprietary API which the application integration module 250 uses to translate or format the data being transmitted between the centralized portal 130 and the application(s). In some embodiments, the application integration module 250 is pre-programmed with customized software processes that enable communication with a specific application. In some embodiments, the application integration module 250 is coupled to additional hardware devices (e.g., telco modem) that provide a way to communicate with a particular application.

Figure 3:
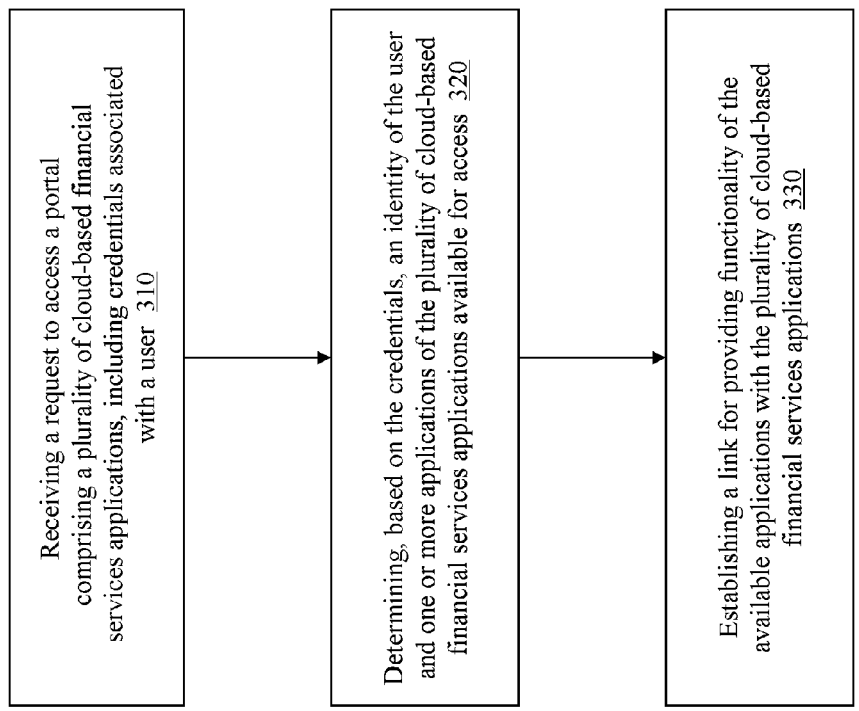
FIG. 3 is a flow diagram of a method for providing an integrated suite of cloud-based, hosted, and internal financial services applications.

FIG. 3 is a flow diagram of a method 300 for providing an integrated suite of cloud-based, hosted, and internal applications, using the system 100 of FIG. 1 and the centralized portal 130 of FIG. 2. The centralized portal 130, via the communication module 260, receives (310) a request from a client device 110 to access the portal 130 comprising a plurality of cloud-based applications 140a-140d, hosted application(s) 150, and internal application(s) 160. The request includes credentials associated with a user (e.g., username, password) of the client device 110. The centralized portal 130, via the authentication/SSO module 210 and the identity data store 220, determines (320) an identity of the user. The centralized portal 130, via the provisioning module 230 and the entitlement data store 240, determines (320) one or more applications of the plurality of applications 140a-140d, 150, and 160 available for access by the client device 110. The centralized portal 130, via the application integration module 250, establishes (330) a link with the available applications 140a-140d, 150 and 160 for providing functionality of the available applications.

Figure 4:
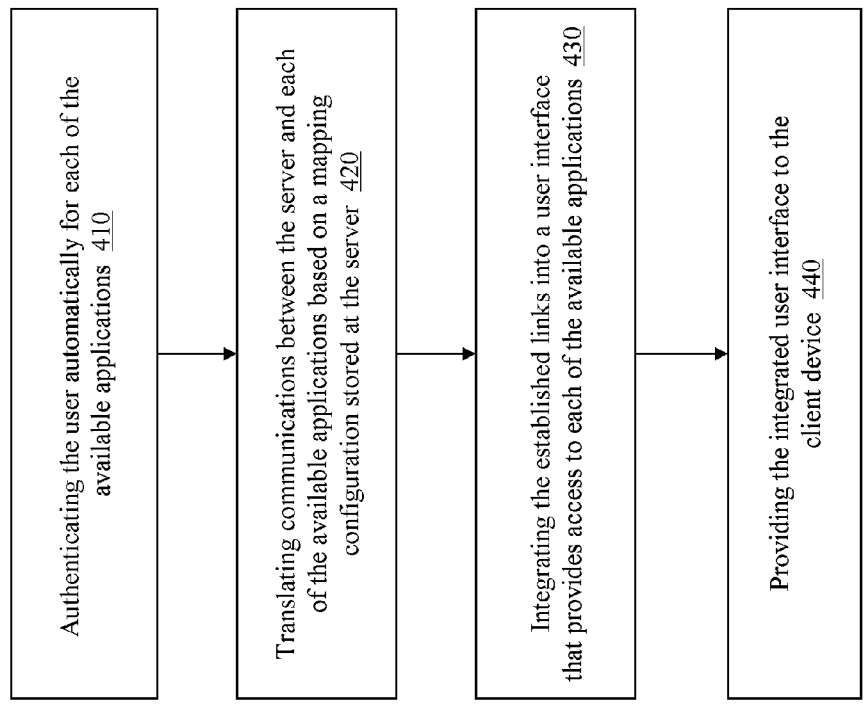
FIG. 4 is a flow diagram of a method for establishing a link for providing functionality of the available applications with the plurality of cloud-based, hosted, and internal financial services applications.

FIG. 4 is a flow diagram of a method 400 for establishing a link for providing functionality of the available applications 140a-140d, 150, and 160 with the plurality of applications, using the system 100 of FIG. 1 and the centralized portal 130 of FIG. 2. The centralized portal 130, via the application integration module 250, authenticates (410) the user of the client device 110 automatically for each of the available applications 140a-140d, 150, and 160. The application integration module 250 translates (420) communications between the server 135 and each of the available applications 140a-140d, 150, and 160 based on a mapping configuration stored at the server 135. The centralized portal 130 integrates (430) the established links into a user interface that provides access to each of the available applications. The centralized portal 130 provides (440) the user interface to the client device 110.

The application integration module 250 also operates to control the integration of data between the various applications 140a-140d, 150, and 160 used via the portal 130. For example, if a registered investment advisor using the system has just signed on a new client, the advisor can access a CRM application (e.g., cloud-based application 140a) and generate a new client record, including data such as the client's name, address, and other demographic information. Once the information is entered in the CRM application, the application integration module 250 can determine that another of the available applications (e.g., cloud-based brokerage application 140d) should receive part of all of the client's information in order to configure a brokerage account for the client. The application integration module 250 transmits the necessary information to the brokerage application 140d without requiring the advisor to manually re-enter the client's information in the second application 140d.

However, in some cases, the brokerage application 140d utilizes data structures that are different from the CRM application 140a. The application integration module 250 maps the CRM information to a data structure associated with the brokerage application 140d. Mapping techniques might include, for example, XML, flat file, Electronic Data Exchange (EDI), use of proprietary APIs, or other similar technologies. As an example, the CRM application 140d might use a String data structure to store the customer telephone number, while the brokerage application 140d might use three separate Number data structures to store the telephone number (e.g., area code, first set of three digits, and second set of four digits). The application integration module 250 can, for example, parse the String data structure of the CRM application 140a, extract the three separate parts of the telephone number, and create three separate Number data structures according to the requirements of the brokerage application 140d. Also, in some embodiments, the application integration module 250 also maintains a database to assist with the mapping process by storing instructions used to map the data from one application to another (e.g., relationships between applications and/or between data fields of applications). In this manner, the application integration module 250 can execute complex data workflows that exchanges necessary data between any of the applications 140a-140d, 150, and 160 to which the advisor has access, ensuring the synchronization of the data without requiring manual intervention by the advisor.

This type of data integration technique is also applicable when an advisor updates or otherwise changes data in one application. For example, the advisor updates the client's mailing address in the CRM application 140a. The application integration module 250 receives the changed address data, and determines that the corresponding information stored in the brokerage application 140d should also be updated. The application integration module 250 uses the mapping technique to transmit the changed address to the brokerage application 140d.

In addition, the application integration module 250 can also control the timing of information updates across the applications 140a-140d, 150, and 160. For example, the application integration module 250 can assign an urgency type to particular data fields in particular applications. Urgency types, as an example, can be assigned to data based on whether the data is prone to change during the day (e.g., stock price quotes), referred to as a real-time urgency type, whether it needs to be changed in other systems to ensure data uniformity and avoid confusion when the applicable third-party needs it (e.g., customer mailing address), referred to as a on-demand urgency type, or whether it can remain unchanged until a convenient time to change (e.g., previous day's market closing value need not be change until the following day), referred to as a batch urgency type.

The application integration module 250 generates a request based on the urgency type of the changed data and the identity of the application that is to receive the data. For example, for a real-time urgency type, the application integration module 250 can generate an immediate request to push the data. For a batch urgency type, the application integration module 250 can generate a request to be included in a batch run that will submit all of the batched data at a convenient time, such as in the middle of the night at a low traffic time. For an on-demand urgency type, the application integration module 250 can generate a request to be included when the receiving application requests the data that has been updated. The request includes the changed data, which has been mapped to a data structure associated with the receiving application.

The application integration module 250 sends the request to the receiving application across a communications network according to the urgency type. For example, for a real-time urgency type, the application integration module 250 generates an immediate request to push the data. For a batch urgency type, the application integration module 250 generates a request to be included in a batch run that will submit all of the batched data at a predetermined time. For an on-demand urgency type, the application integration module 250 generates a request to be included when the receiving application requests the data that has been updated. As can be appreciated, the term request in this context is used broadly to represent any format of the delivery of the updated data according to its urgency type.

Figure 5:
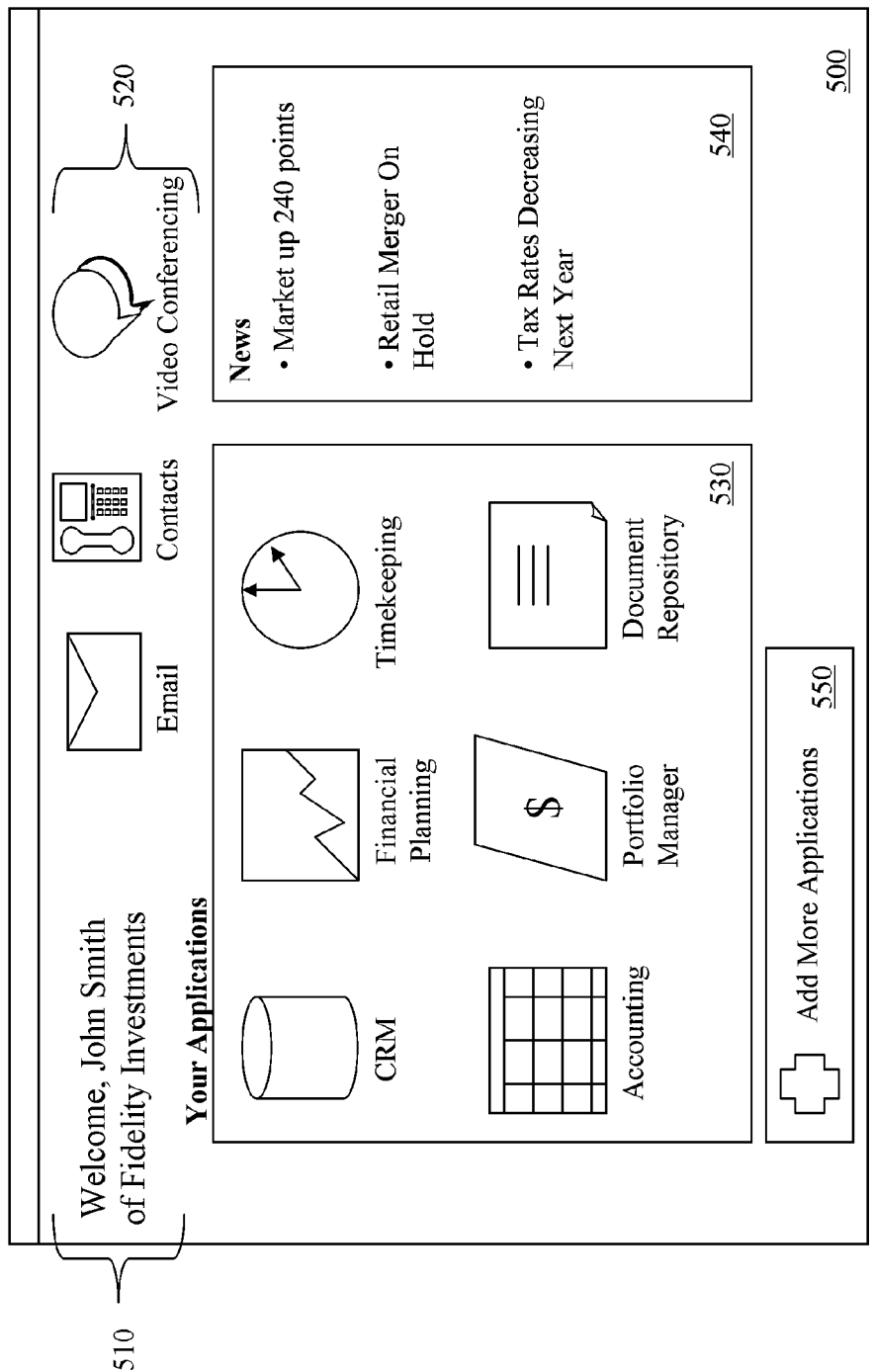
FIG. 5 is a diagram of an exemplary user interface including an integrated suite of links to the plurality of cloud-based financial, hosted, and internal services applications.

FIG. 5 is a diagram of an exemplary user interface 500 including an integrated suite of links 520, 530 to the plurality of applications 140a-140d, 150, and 160. After the centralized portal 130 has validated the user and established links to the available cloud-based applications 140a-140d, the available hosted application(s) 150, and the available internal application(s) 160, the centralized portal 130 integrates the links into a user interface 500 and provides the user interface 500 to the client device 110. The user interface 500 includes an area 510 that identifies the user (e.g., John Smith of Fidelity Investments). In doing so, the user is assured that he or she has been identified appropriately by the portal 130. The user interface 500 also includes one or more groups of links 520, 530 that correspond to the applications 140a-140d, 150 and 160 to which the user has access and the centralized portal has connected. The links 520 relate to types of communications applications (e.g., email, contacts, video conferencing), while the links 530 relate to financial services and productivity applications (e.g., CRM, Accounting, Financial Planning, Portfolio Manager, Timekeeping, and Document Repository). The user interface 540 also includes an area 540 containing news headlines and links (e.g., web links) to information that is of interest to the user. The news information can be obtained from a cloud-based application, just like other applications shown in FIG. 5.

In some embodiments, the user interface 500 is displayed on the client device 110 via web browsing software. For example, the user at the client device 110 opens a web browser and navigates to the address of the server 135 hosting the centralized portal 130. The centralized portal 130 displays a login screen to the user which includes prompts for the user to enter his or her credentials (e.g., username, password) to access the portal 130. Upon submission and successful verification of the credentials, the centralized portal 130 aggregates links to each of the available applications 140*a*-140*d*, 150, and 160, and integrates the links into the user interface 500—providing a single site that provides the user with immediate access to all of his or her applications.

A user accesses the individual applications (e.g., CRM application in FIG. 5) by clicking on the link or icon attributed to the application. In some embodiments, the centralized portal 130 can open a new window (e.g., browser tab) that contains a direct link to the server on which the application is located. In some embodiments, the centralized portal 130 retrieves data and functionality from the application that was selected, and presents the retrieved information in a proprietary interface associated with the portal 130. An advantage of the latter approach is that the user interfaces for each of the applications can be designed with a similar "look and feel," enabling the user to have a higher comfort level and familiarity in interacting with the various applications—leading to increased productivity and a lesser need for individualized training for each application.

The user interface 500 also includes an area 550 that provides access to additional applications that the user may not currently be allowed to use. For example, the user may want to use a reporting application due to a new job responsibility or assigned project. The user can click the area 550 to view a list of additional applications that can be provided. In some embodiments, upon clicking the area 550, the centralized portal 130 presents the list of additional applications and the user can simply select which application(s) he or she wants. Upon returning to the main portal screen 500, the user can see links to the selected applications automatically added to the screen. In some embodiments, upon clicking the area 550, the centralized portal 130 transfers the user to an internal or external application store where the user can opt to purchase additional applications (or functionality for existing applications). Upon completing a purchase and returning to the main portal screen 500, the user can see links to the applications he or she purchased. In this manner, the centralized portal 130 provides a robust self-service feature where a user can quickly customize the suite of applications and functionality that are available, without requiring manual configuration or intervention by the service providers.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, tablet, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®, an Android®-based device, or an iPhone®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for providing an integrated suite of cloud-based, hosted, and internal applications, the method comprising:

receiving, at a server computing device from a client computing device, a request to access a portal comprising a plurality of cloud-based, hosted, and internal applications, the request to access including credentials associated with a user of the client computing device;

determining, at the server computing device and based on the credentials, an identity of the user, and one or more applications of the plurality of applications available for access by the user;

establishing, by the server computing device with one or more computing devices hosting the one or more available applications, a link for providing functionality of the available applications, wherein the establishing step includes authenticating the user automatically for each of the available applications;

receiving, by the server computing device, a communication from a first available application, the communication intended for a second available application and including changed data associated with the first available application;

determining, by the server computing device, an urgency type of the communication;

mapping, by the server computing device, the changed data to a data structure associated with the second available application based on a mapping configuration stored at the server computing device;

generating, by the server computing device, a request based on the urgency type and the second available application, the request including the data structure for updating a database associated with the second available application;

sending, by the server computing device, the request to the second available application based on the urgency type;

updating, by the server computing device, data in a database associated with the server computing device, the updating based on the changed data;

integrating, by the server computing device, the established links into a user interface that provide access to each of the available applications; and providing, by the server computing device, the integrated user interface to the client computing device.

2. The method of claim 1, further comprising:

storing, by the server computing device, the integrated user interface and associated established links into a profile associated with the user.

3. The method of claim 1, further comprising:

receiving, by the server computing device from the client computing device, a request for access to an additional application not currently available to the user;

updating, by the server computing device, the one or more applications available to be accessed by the user to include the additional application; and establishing, by the server computing device with the computing device hosting the additional application, a link for providing functionality of the additional application.

4. The method of claim 1, the determining step further comprising:

determining, at the server computing device and based on the credentials, one or more functions of the available applications that are accessible by the user.

5. The method of claim 1, further comprising:

receiving, by the server computing device from the client computing device, a search request including a keyword;

transmitting, by the server computing device to a plurality of the available applications, the search request; and receiving, at the server computing device from the plurality of the available applications, a response to the search request including information associated with the keyword.

6. The method of claim 1, further comprising:
tracking, by the server computing device, communications between the server computing device and the one or more available applications; and
storing, by the server computing device, the tracked communications.

7. The method of claim 1, wherein the links between the server computing device and the one or more computing devices hosting the one or more available applications are established using an application programming interface (API) associated with the respective available applications.

8. The method of claim 7, wherein the functionality available in each API is based on the user identity.

9. The method of claim 1, wherein the cloud-based, hosted, and internal applications of the plurality of applications are offered by different third-party providers.

10. The method of claim 1, wherein the integrated user interface further comprises a dashboard of the established links, the method further comprising:
receiving, by the server computing device from the client computing device, a request to access one of the available applications represented by an established link; and
providing, by the server computing device, a separate user interface for the requested application.

11. The method of claim 10, wherein the separate user interface is customized based on the user identity.

12. The method of claim 1, wherein the plurality of cloud-based, hosted, and internal applications includes productivity applications, business management applications, customer relationship management applications, database applications, accounting applications, document storage applications, portfolio management applications, financial planning applications, asset allocation applications, social network applications, or any combination thereof.

13. A system for providing an integrated suite of cloud-based, hosted, and internal applications, the system comprising a server computing device configured to:
receive, from a client computing device, a request to access a portal comprising a plurality of cloud-based, hosted, and internal applications, the request to access including credentials associated with a user of the client computing device;
determine, based on the credentials, an identity of the user, and one or more applications of the plurality of applications available to be accessed by the user;
establish, with one or more computing devices hosting the one or more available applications, a link for providing functionality of the available applications, wherein the establishing step includes authenticating the user automatically with each of the available applications;
receive a communication from a first available application, the communication intended for a second available application and including changed data associated with the first available application;
determine an urgency type of the communication;
map the changed data to a data structure associated with the second available application based on a mapping configuration stored at the server computing device;
generate a request based on the urgency type and the second available application, the request including the data structure for updating a database associated with the second available application;
send the request to the second available application based on the urgency type;
update data in a database associated with the server computing device, the update based on the changed data;
integrate the established links into a user interface that provides access to each of the available applications; and
provide, to the client computing device, the integrated user interface.

14. A computer program product, tangibly embodied in a non-transitory computer readable storage medium, for providing an integrated suite of cloud-based, hosted, and internal applications, the computer program product including instructions operable to cause a server computing device to:
receive, from a client computing device, a request to access a portal comprising a plurality of cloud-based, hosted, and internal applications, the request to access including credentials associated with a user of the client computing device;
determine, based on the credentials, an identity of the user, and one or more applications of the plurality of applications available to be accessed by the user;
establish, with one or more computing devices hosting the one or more available applications, a link for providing functionality of the available applications, wherein the establishing step includes authenticating the user automatically with each of the available applications;
receive a communication from a first available application, the communication intended for a second available application and including changed data associated with the first available application;
determine an urgency type of the communication;
map the changed data to a data structure associated with the second available application based on a mapping configuration stored at the server computing device;
generate a request based on the urgency type and the second available application, the request including the data structure for updating a database associated with the second available application;
send the request to the second available application based on the urgency type;
update data in a database associated with the server computing device, the update based on the changed data;
integrate the established links into a user interface that provides access to each of the available applications; and
provide, to the client computing device, the integrated user interface.

15. The system of claim 13, wherein the server computing device is further configured to store the integrated user interface and associated established links into a profile associated with the user.

16. The system of claim 13, wherein the server computing device is further configured to:
receive, from the client computing device, a request for access to an additional application not currently available to the user;
update the one or more applications available to be accessed by the user to include the additional application; and
establish, with the computing device hosting the additional application, a link for providing functionality of the additional application.

17. The system of claim 13, the determining step further comprising determining, based on the credentials, one or more functions of the available applications that are accessible by the user.

18. The system of claim 13, wherein the server computing device is further configured to:

receive, from the client computing device, a search request including a keyword;

transmit, to a plurality of the available applications, the search request; and receive, from the plurality of the available applications, a response to the search request including information associated with the keyword.

19. The system of claim 13, wherein the server computing device is further configured to track communications between the server computing device and the one or more available applications, and store the tracked communications.

20. The system of claim 13, wherein the links between the server computing device and the one or more computing devices hosting the one or more available applications are established using an application programming interface (API) associated with the respective available applications.

21. The system of claim 20, wherein the functionality available in each API is based on the user identity.

22. The system of claim 13, wherein the cloud-based, hosted, and internal applications of the plurality of applications are offered by different third-party providers.

23. The system of claim 13, wherein the integrated user interface further comprises a dashboard of the established links and the server computing device is further configured to:

receive, from the client computing device, a request to access one of the available applications represented by an established link; and provide a separate user interface for the requested application.

24. The system of claim 23, wherein the separate user interface is customized based on the user identity.

25. The system of claim 13, wherein the plurality of cloud-based, hosted, and internal applications includes productivity applications, business management applications, customer relationship management applications, database applications, accounting applications, document storage applications, portfolio management applications, financial planning applications, asset allocation applications, social network applications, or any combination thereof.

* * * * *